United States Patent
Silvlin

(10) Patent No.: US 9,764,735 B2
(45) Date of Patent: Sep. 19, 2017

(54) LANE KEEPING SUPPRESSING SYSTEM AND METHOD

(71) Applicant: VOLVO CAR CORPORATION, Gothenburg (SE)

(72) Inventor: Jonatan Silvlin, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 10 days.

(21) Appl. No.: 14/715,680

(22) Filed: May 19, 2015

(65) Prior Publication Data
US 2015/0344029 A1    Dec. 3, 2015

(30) Foreign Application Priority Data
May 27, 2014    (EP) .................................. 14170079

(51) Int. Cl.
| | |
|---|---|
| *B60W 30/08* | (2012.01) |
| *B60W 30/12* | (2006.01) |
| *B60W 30/00* | (2006.01) |
| *B62D 15/02* | (2006.01) |

(52) U.S. Cl.
CPC ............ *B60W 30/08* (2013.01); *B60W 30/00* (2013.01); *B60W 30/12* (2013.01); *B62D 15/025* (2013.01); *B62D 15/0265* (2013.01); *B60W 2550/10* (2013.01)

(58) Field of Classification Search
None
See application file for complete search history.

(56) References Cited

U.S. PATENT DOCUMENTS

| | | | | |
|---|---|---|---|---|
| 8,346,437 B2* | 1/2013 | Hayakawa | ............ | B60W 30/12 180/167 |
| 8,428,821 B2* | 4/2013 | Nilsson | ................ | B62D 15/025 701/41 |
| 8,626,431 B2* | 1/2014 | Okita | .................... | B60W 30/12 701/301 |

(Continued)

FOREIGN PATENT DOCUMENTS

| | | |
|---|---|---|
| DE | 102011082480 | 3/2013 |
| EP | 1977946 | 10/2008 |

(Continued)

OTHER PUBLICATIONS

Extended European Search Report for European Application No. 14170079.9, Completed by the Eurpean Patent Office, Dated Nov. 13, 2014, 8 Pages.

*Primary Examiner* — Krishnan Ramesh
(74) *Attorney, Agent, or Firm* — Brooks Kushman P.C.

(57) ABSTRACT

A method is disclosed for suppressing or deactivating a lane keeping assist (LKA) system in a host vehicle. The method may include retrieving environmental data from a data gathering system, determining a current lane width based on the environmental data retrieved from the data gathering system, and comparing the current lane width with a pre-set lane width. The method may also include determining that the current lane width is smaller than the pre-set lane width, detecting the presence of an obstacle on the traveling path which obstacle will be passed by the host vehicle or which obstacle will pass the host vehicle within a pre-determined time period, and deactivating or suppressing the lane keeping assist (LKA) system.

20 Claims, 2 Drawing Sheets

(56) References Cited

U.S. PATENT DOCUMENTS

| | | | |
|---|---|---|---|
| 8,996,197 B2* | 3/2015 | Joh | G01C 21/30 701/1 |
| 2006/0047390 A1* | 3/2006 | Scherl | B62D 15/025 701/41 |
| 2010/0191421 A1* | 7/2010 | Nilsson | B62D 15/025 701/41 |
| 2011/0022317 A1* | 1/2011 | Okita | B60W 30/12 701/301 |
| 2012/0130595 A1* | 5/2012 | Hayakawa | B60W 30/12 701/42 |
| 2013/0063599 A1* | 3/2013 | Imai | G06K 9/00798 348/148 |
| 2013/0096767 A1* | 4/2013 | Rentschler | B60W 30/12 701/28 |
| 2014/0324325 A1* | 10/2014 | Schlensag | B60W 30/18163 701/116 |
| 2014/0379164 A1* | 12/2014 | Joh | G01C 21/30 701/1 |
| 2015/0175159 A1* | 6/2015 | Gussner | B62D 15/0265 701/1 |
| 2015/0291216 A1* | 10/2015 | Sato | B60W 50/14 701/23 |
| 2016/0107687 A1* | 4/2016 | Yamaoka | B62D 15/025 701/41 |

FOREIGN PATENT DOCUMENTS

| | | |
|---|---|---|
| JP | 2008143263 | 6/2008 |
| JP | 2011134071 | 7/2011 |

\* cited by examiner

LANE KEEPING SUPPRESSING SYSTEM AND METHOD

CROSS-REFERENCE TO RELATED APPLICATIONS

This application claims foreign priority benefits under 35 U.S.C. §119(a)-(d) to European patent application number EP 14170079.9, filed May 27, 2014, which is incorporated by reference in its entirety.

TECHNICAL FIELD

The disclosure pertains to a method for suppressing or deactivating a lane keeping system in a host vehicle, a control unit for controlling a lane keeping system in a host vehicle, and a vehicle comprising the control unit.

BACKGROUND

It is known to equip a vehicle with one or more computerized driver assist or support systems. Such systems are provided in order to prevent or reduce the incidence and/or impact of accidents by informing and assisting a human driver when performing actions such as braking and steering. One example of a commonly used assist system is a lane keeping assist system (LKA). The lane keeping assist system operates by keeping a host vehicle driving along a traveling path within safe outer side limits of a lane on the traveling path. The LKA system reduces or eliminates the need for a driver of the vehicle to steer the vehicle along the traveling path.

However, when the available lane width is temporarily reduced by an obstacle such as an oncoming vehicle or a pedestrian walking along the road, a driver of the host vehicle may wish to override steering from the LKA system, and steer the vehicle closer to an outer lane limit than the LKA system would otherwise allow. In some situations, the driver may even determine that it is safer to leave the road altogether in order to avoid a collision with an oncoming vehicle or other obstacle on the road.

Published patent application US 20100191421 A1 discloses a system and a method for supporting lane keeping of a vehicle equipped with a steering device. A guiding force from the system can be deactivated or decreased, resulting in the driver experiencing a weaker resistance from the steering device/steering wheel when using the steering device to steer the vehicle. US 20100191421 A1 also teaches that the lane departure warning can be disabled when driving on a narrow road.

SUMMARY

It is an object of the disclosure to provide an improved system for reducing or eliminating interference from an LKA-system with driver steering actions in critical traffic situations, in particular on narrow roads. This object may be achieved by the subject-matter described herein. Embodiments are set forth in the appended claims, in the following description, and in the drawings.

As disclosed herein, there is provided a method for suppressing or deactivating a lane keeping system in a host vehicle. The method comprises:

a) retrieving environmental data from a data gathering system;

b) determining a current lane width based on the environmental data retrieved from the data gathering system;

c) comparing the current lane width with a first pre-set lane width;

d) determining that the current lane width is smaller than the first pre-set lane width;

e) detecting the presence of an obstacle on the traveling path which obstacle will be passed by the host vehicle or which obstacle will pass the host vehicle within a predetermined time period; and f) deactivating or suppressing the lane keeping system.

The host vehicle may be any type of vehicle which is equipped with an LKA system, such as a car, a truck, a bus, etc. In particular, the host vehicle may be a vehicle intended for driving on public roads.

As disclosed herein, the lane keeping assist, LKA, system is suppressed or deactivated if a situation is detected making it potentially unsafe to stay within a lane or on a road. This may occur on roads which are partially blocked by an obstruction or on narrow roads where oncoming traffic makes it necessary to drive at the edge of the roadway or even fully or partially outside of the roadway.

The detected current lane width, w_cur, is compared with a pre-set lane width which may be a critical lane width, w_crit, a comfortable lane width, w_comf or any other suitable lane width which has been set to trigger a suppression or deactivation of the LKA system. As disclosed herein, deactivation of the LKA system may take place stepwise, with gradually more functions of the LKA system being suppressed or disabled depending on the detected lane width in relation to the pre-set lane width. The system as disclosed herein may also take into consideration the size, i.e. width of a detected obstacle and/or the relative speed between a detected obstacle and the host vehicle when determining the degree of suppression or deactivation of the LKA suppression system.

By way of example, if an oncoming vehicle is detected and calculated to pass the host vehicle within a pre-set time period t_p, the lane keeping suppression system as disclosed herein detects an oncoming vehicle. If it has been determined that the current lane width is smaller than the pre-set lane width, the lane keeping assist system is automatically suppressed or deactivated.

As disclosed herein, the method step a) may include:

i) using a satellite positioning system to determine a current position of the host vehicle on the traveling path; and determining the current lane width of the traveling path from electronic horizon, EH, data based on the current position of the host vehicle.

Accordingly, in the system and the method disclosed herein, lane width detection may be based on electronic horizon (EH) data which is mapped onto the position of the host vehicle as determined by a positioning system, such as a Global Positioning System (GPS).

A difficulty with currently used LKA systems may be to achieve accurate lane width determination for the traveling path of the host vehicle. Lane width determination is commonly based on information from a data gathering system using equipment on the vehicle such as cameras and radars. It has been found that such equipment may erroneously lock on a wrong marker such as a ditch or a track in soil or snow outside the edge of the road or may work less well than desired in adverse weather conditions. Lane width determination may also be difficult on roads with poor quality road markings. As line width calculation based on faulty information may make the lane width determination unreliable, it is a concern to ascertain that the gathered information concerning the vehicle surroundings is as accurate as possible. By using EH data to determine a current lane width either alone or in combination with other data gathered by the data gathering system, the negative influence of e.g. poor quality road markings may be avoided or at least reduced.

A conventional lane keeping system relying on vehicle carried equipment such as cameras and radars for gathering data to be used when determining a current lane width may be inadequate in some situations. If the data gathering system fails to correctly register a lane limit, the LKA system will receive inaccurate information for lane width calculation. The accuracy of the information retrieved from cameras is dependent on factors such as weather conditions and the provision and quality of road markings Hence, in some situations, it may be desirable to carry out lane width determination fully or partly based on data from a positioning system such as a Global Positioning System, GPS.

An obstacle which is detected on the traveling path may be any kind of obstacle or combination of obstacles. Accordingly, the obstacle may be a moving obstacle such as another vehicle, a pedestrian or an animal or may be a stationary obstacle such as a parked car, a fallen tree, or a road block.

Vehicles on the traveling path may be oncoming vehicles, slow-moving vehicles that are overtaken by the host vehicle, or overtaking vehicles that move faster than the host vehicle in the same direction as the host vehicle. When passing a slow-moving road user such as a pedestrian or a cyclist, it may be desirable to be able to steer sufficiently far away from the road user to allow room for wobbling and other unexpected sideways movements.

Steering actions from a human driver of the host vehicle may conflict with comfortable limits for lane keeping and/or critical limits for lane keeping determined by the LKA system. This means that if the driver tries to steer the vehicle closer to a lane edge than is permitted by the LKA system, or pass over a lane border, counter instructions from the LKA-system may interfere with or even counteract the driver's steering intentions. As disclosed herein, when traveling on a narrow road or in a narrow lane, the LKA system is automatically suppressed or deactivated when an obstacle is detected on the traveling path of the vehicle, permitting the driver to steer the vehicle closer to a lane edge than would otherwise have been permitted by the LKA system. If the LKA system is completely deactivated, the driver can steer the vehicle over the lane edge and leave the lane and even the road, if needed, without contrary commands from the LKA system.

In a critical or suddenly arising traffic situation, a driver of a vehicle may judge that the safest way to handle the traffic situation is to drive at the very edge of the road or to leave the lane in which the vehicle is traveling partly or completely. Accordingly, it may be safer to steer into a field on the side of the road in order to avoid colliding with an oncoming vehicle on a narrow road or to pass over into an oncoming lane in order to avoid an obstacle in the lane in which the vehicle is traveling. Critical traffic situations may arise suddenly and unexpectedly and may involve sudden steering actions e.g. to avoid an animal or person running out into the roadway, or an overtaking vehicle, cyclist or other vehicle swerving into the lane in which the host vehicle is traveling.

In the method as disclosed herein, a degree of suppression or deactivation of the LKA system may be determined based on the pre-set lane width. By way of example, if the pre-set lane width allows comfortable room for the host vehicle to maneuver within the lane in which the vehicle is traveling, the degree of deactivation or suppression of the LKA system may be lower than if the pre-set lane width is close to a critical lane width of the LKA system.

Furthermore, in the method as disclosed herein, step f) may be performed by suppression or partial deactivation of the LKA system to a first degree of suppression or partial deactivation which first degree of suppression or partial deactivation is determined based on the pre-set first lane width $w\_set_1$.

The method may then further comprise:
g) comparing the current lane width with a second pre-set lane width;
h) suppressing or deactivating the LKA system to a second degree of suppression or partial deactivation which is determined based on the pre-set second lane; and optionally
i) iterating steps g) and h) one or more times.

Accordingly, the degree of deactivation or suppression of the LKA system may be made dependent on the relation in size between the current lane width and the pre-set lane width to which the current lane width is compared. Accordingly, a high degree of suppression or even complete deactivation may be applied when the current lane width is considerably smaller than the pre-set lane width. In particular when the pre-set lane width is a critical lane width it may be desirable that the driver gains full control of the steering of the vehicle. A greater influence from the LKA system may be accepted when the pre-set lane width is a comfortable lane width.

The method as disclosed herein may include determining a relative speed between the obstacle and the host vehicle and calculating the pre-determined time period as a function of the relative speed.

The pre-set lane width, with which the current lane width is compared, may be a critical lane width as defined herein. The critical lane width is smaller than a comfortable lane width as defined herein. Hence, it may be desirable to only suppress or deactivate a LKA system if the current lane width is insufficient for keeping the vehicle within the lane.

The pre-set lane width, with which the current lane width is compared, may be the comfortable lane width as set out above.

In the method as disclosed herein, detecting the presence of an obstacle may be performed based on data retrieved from the data gathering system. A data gathering system may comprise equipment carried by the host vehicle such as one or more cameras, one or more radars, etc., as well as equipment located outside the host vehicle as is the case in a Vehicle-to-Vehicle, V2V, system, and in a positioning system. The data collected by the data gathering system is usually transferred to a CPU where it is processed and subsequently transformed into electronic signals for controlling the LKA system.

There is further provided a control unit for use in the method for controlling a lane keeping system in a host vehicle, as disclosed herein, the control unit being arranged to:
  receive data from a data gathering system;
  determine a current lane width of a traveling path on which said host vehicle is traveling based on data retrieved from the data gathering system;
  compare the current lane width with a first pre-set lane width,
  determine whether the current lane width is smaller than the first pre-set lane width,
  detect the presence of an obstacle on the traveling path
  determine whether the obstacle will be passed by the host vehicle or will pass the host vehicle within a pre-determined time period; and to deactivate or suppress the lane keeping system if the current lane width is smaller than the comfortable lane width; or to deactivate or suppress the lane keeping system if the current lane width is smaller than the comfortable lane width and an obstacle is present on the traveling path which obstacle will be passed by the host vehicle or will pass the host vehicle within the pre-determined time period.

The control unit may be arranged to determine the current lane width by determining a current position of the host vehicle on the traveling path and determining the current lane width using electronic horizon, EH, data derived from the current position of the host vehicle.

The control unit may be arranged to suppress or partially deactivate the lane keeping LKA system to a first degree of suppression or partial deactivation which is determined based on the pre-set first lane width.

The control unit may further be arranged to:

compare the current lane width with a second pre-set lane width;

suppress or deactivate the LKA system to a second degree of suppression or partial deactivation which is determined based on the pre-set second lane width. The control unit may optionally be arranged to reiterate these two steps so that the system may adapt the degree of deactivation of the LKA system to the available lane width.

The control unit may be arranged to determine whether the obstacle on the traveling path is a moving obstacle or a stationary obstacle.

Furthermore, the control unit may be arranged to determine a relative speed between the obstacle and the host vehicle, and to calculate the pre-determined time period as a function of the relative speed.

The pre-set lane width, with which the current lane width is compared, may be a critical lane width as defined herein. The critical lane width is smaller than a comfortable lane width as defined herein.

The pre-set lane width, with which the current lane width is compared, may be the comfortable lane width as set out above.

The control unit may be arranged to detect the presence of an obstacle on the traveling path based on data retrieved from a data gathering system as disclosed herein.

A vehicle as disclosed herein may comprise a lane keeping assist system and a control unit for controlling the lane keeping assist system as disclosed herein.

Definitions

A "vehicle path" as used herein is any road along which the vehicle may move. The vehicle path is typically a public road.

A "data gathering system" is any system comprising data gathering equipment and components such as cameras, radars, communication devices, processors, etc.

"Electronic horizon (EH) data" for a host vehicle is data which is obtained based on the position of the vehicle as determined by a positioning system. The coordinates for the vehicle which are obtained from the positioning system are mapped on a database and the data retrieved from the data base for the position of the vehicle is used i.a. to determine the lane width at the current position of the vehicle. The positioning system may be any available positioning system, such as a Global Positioning System (GPS) and the data base may be a map.

A "lane keeping assist (LKA) system" is a computerized driver assist or support system which operates by keeping a host vehicle driving along a traveling path within the outer side limits of a lane extending along the traveling path. The LKA system reduces or eliminates the need for a driver of the vehicle to steer the vehicle along the traveling path. The LKA system may keep the vehicle driving centrally in the lane, or positioned in the lane according to detected or input preferences of a human driver.

As used herein, a "current detected lane width, w_cur", is the lane width at the current position of a host vehicle and is determined from data gathered by the data gathering system, which data may include or consist of electronic horizon (EH) data mapped on the vehicle's position obtained from a positioning system such as a Global Positioning System (GPS).

As used herein, a "critical lane width, w_crit", is determined as a minimum lane width which would safely accommodate the width of the host vehicle. A critical lane width may be in the order of 3 meters. However, the critical lane width may be set at different values depending on factors such as the width of the host vehicle, the speed of the host vehicle, weather conditions, road conditions, the size and speed of an obstacle in the traveling path, etc.

As used herein, a "comfortable lane width, w_comf", is determined as a lane width which would comfortably accommodate the width of the host vehicle. The comfortable lane width, w_comf is greater than the critical lane width. As for the critical lane width, the comfortable lane width may be set at different values depending on factors such as the width of the host vehicle, the speed of the host vehicle, weather conditions, road conditions, the size and speed of an obstacle in the traveling path, etc.

Suppressing or deactivating an LKA system may involve disabling functions such as lane departure warning (LDW) and/or disabling or reducing the influence of the LKA system on the steering of the vehicle. Accordingly, in the situations disclosed herein it may be desirable that warning signals such as audio warnings or haptic warnings such as vibrations in the steering wheel are disabled. Furthermore, the LKA system may be configured to detect that the driver is willfully performing steering which is contrary to the steering commands from the LKA system. In such cases the LKA system detects a "driver in the loop", DIL, and the interaction from the LKA system in steering the vehicle is faded out during a time period. In the LKA suppressing/deactivating system as disclosed herein, suppression of the LKA system may involve applying a shortened fade-out time in a detected DIL situation.

A fully operational LKA system may be completely computer-controlled, while the control of a suppressed LKA system is partly computerized and partly performed by a human driver. When the LKA system is completely deactivated, the driver has full control of the steering of the vehicle. The driver may experience suppression of the LKA system as a reduced resistance to manual steering.

BRIEF DESCRIPTION OF THE DRAWINGS

The present disclosure will be further explained hereinafter by means of non-limiting examples and with reference to the appended drawing wherein.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
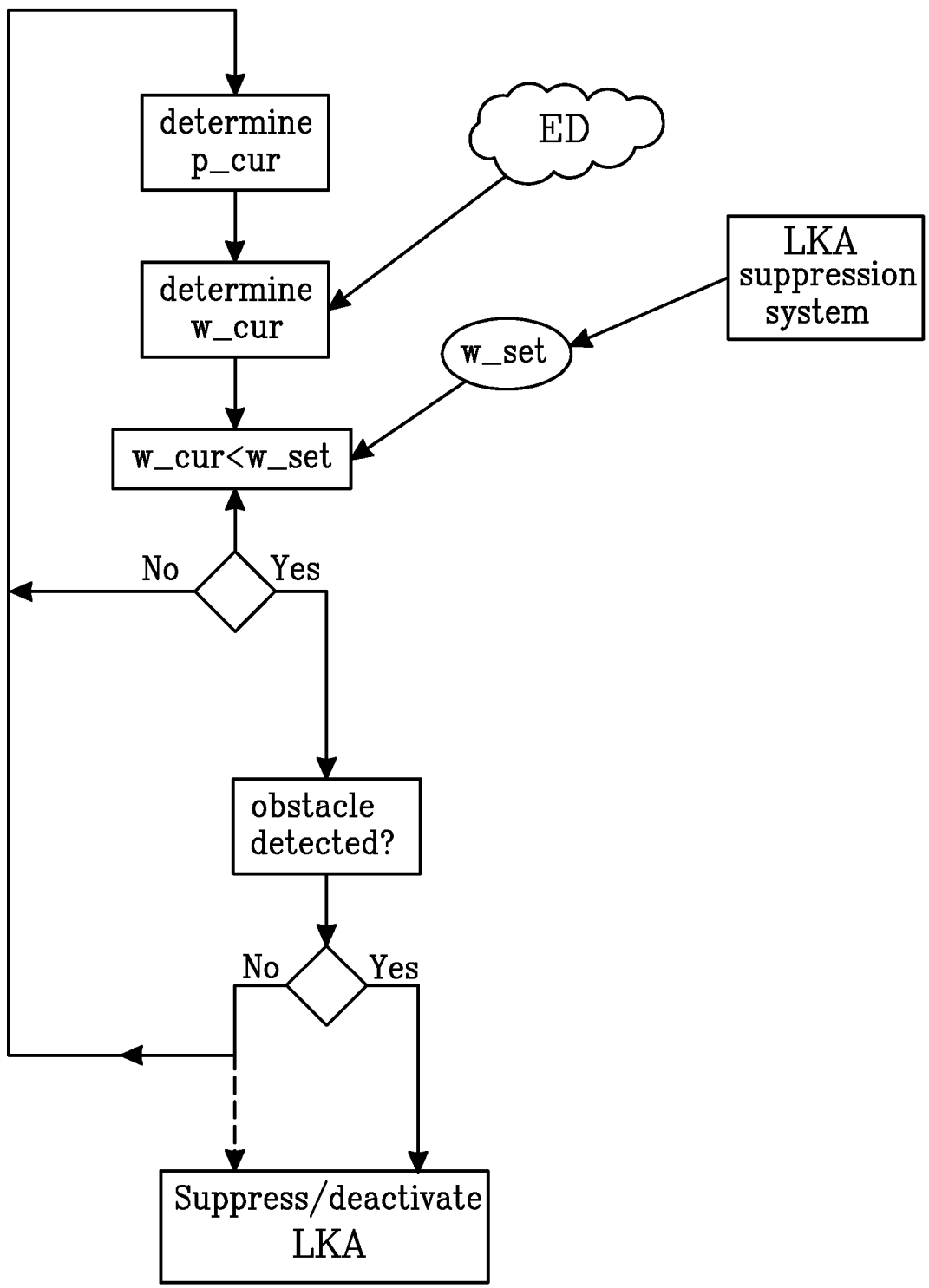
FIG. 1 shows a diagram detailing an algorithm for suppressing/deactivating a lane keeping assist system.

As shown in the diagram in FIG. 1, the method for suppressing or deactivating a lane keeping assist, LKA, system, in a host vehicle as disclosed herein may comprise using a satellite positioning system to determine a current position p_cur of a host vehicle on a traveling path, such as a public road. The lane width of the traveling path at the position of the host vehicle may be conveniently determined using environmental data, ED, in the form of electronic horizon, EH, data which is derived from a data base containing data related to the position of the host vehicle as determined by the satellite positioning system. As set out herein the satellite positioning system may be a Global Positioning System (GPS) or any other available satellite positioning system. It is to be understood that the described way of determining the current lane width may be supplemented with or substituted by lane width determination based on other types of environmental data such as data which has been gathered by a data gathering system comprising equipment carried by the host vehicle such as one or more cameras, one or more radars, etc., as well as equipment located outside the host vehicle as is the case in a Vehicle-to-Vehicle, V2V, system.

The lane width at the current position of the vehicle is determined to be the current lane width, w_cur, of the traveling path. The current lane width, w_cur, is compared to a pre-set lane width, w_set, which has been input into or calculated by a system as disclosed herein for carrying out a method for suppressing or deactivating an LKA system. As disclosed herein, the pre-set lane width, w_set, may be a critical lane width of the LKA system or may be a comfortable lane width of the LKA system or may be a lane width which is pre-determined in the LKA suppression system and which is different from a lane width limit applied by the LKA system. The system as disclosed herein may be arranged to allow the pre-set lane width to be set at different values, e.g. depending on driver preferences and/or data derived from a driver behavior surveying system. Furthermore, the pre-set lane width may be dependent on factors such as weather conditions, road conditions, the speed limit for the road, the width of the detected obstacle, etc.

If it is determined that the current lane width, w_cur, is smaller than the pre-set lane width, w_set, it is checked whether an obstacle is detected on the traveling path which obstacle will be passed by the host vehicle or which obstacle will pass the host vehicle within a pre-determined time period, t_p.

The pre-determined time period, t_p, is calculated by the LKA suppression system according to algorithms based on factors such as the speed of the vehicle, road conditions, weather conditions, etc. and is set so as to allow the driver as much time as possible to steer the vehicle safely and smoothly when avoiding the obstacle.

In case no obstacle is detected, one option is that no further action is performed and that the method steps are iterated from the start. Alternatively, the system may be set to suppress or deactivate the LKA-system solely based on the detection of a current lane width, w_cur, which is smaller than the pre-set lane width, w_set. This option may in particular be applied in case the current lane width, w_cur, is smaller than a critical lane width, w_crit, of the LKA system.

In case the system detects an obstacle on the traveling path, the LKA system is always suppressed or deactivated, as set out herein.

Suppression or deactivation of the LKA system may in itself be carried out in different steps with a gradually greater degree of suppression or deactivation as the pre-set lane width (w_set) to which the current lane width (w_cur) is compared is gradually decreased.

Accordingly, suppression or partial deactivation of the lane keeping assist (LKA) system may be performed in a first suppression/deactivation step to a first degree of suppression or partial deactivation which may be determined based on a first pre-set lane width, $w\_set_1$.

The current lane width w_cur may subsequently be compared with a second pre-set lane width, $w\_set_2$, which is smaller than the first pre-set lane width and the LKA system may be suppressed or deactivated to a second degree of suppression or deactivation which is determined based on the pre-set second lane width, $w\_set_2$. These two steps may be iterated one or more times while comparing the current lane width, w_cur, with gradually diminishing first pre-set lane widths $w\_set_n$ and gradually increased suppression/deactivation of the LKA system with diminishing current lane width, w_cur.

Figure 2:
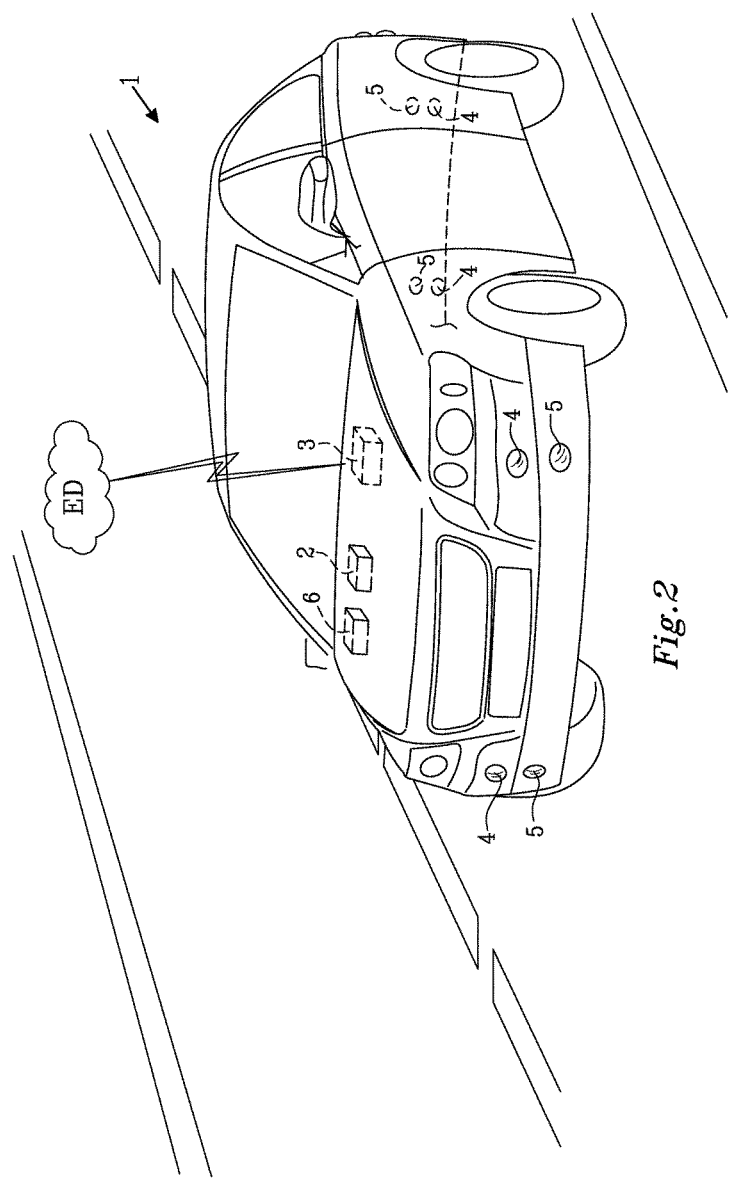
FIG. 2 shows a car with a system for suppressing or deactivating a lane keeping assist system.

The host vehicle is represented in FIG. 2 as a car 1 which is equipped with an LKA system 2 and a control unit 3 for suppressing or deactivating the LKA system. The car 1 is also provided with cameras 4 and radars 5, which form part of a data gathering system. The control unit 3, which may comprise a processor and an associated memory having stored computer executable instructions for performing various functions as described herein, receives environmental data, ED, e.g. in the form of EH data from a positioning system but which may consist of or include other types of environmental data, as set out herein. The data gathering system, the control unit 3 and the LKA system 2 communicate via a central processing unit, CPU, 6, which may have an associated memory with stored computer executable instructions for performing various functions as described herein. The LKA system 2, the control unit 3, the cameras and radars 4, 5 and the CPU are schematically shown. It is to be understood that the components are arranged and connected to perform their individual and collective functions as set out herein. It should also be understood that the number of cameras and radars could be different from what is shown and that they could be differently positioned on the vehicle.

The system and the method disclosed herein may be particularly useful in a situation where the host vehicle is traveling on a narrow road or in a narrow lane and an oncoming vehicle is detected. In such cases signals from an LKA system may be conflicting with a driver's intention to steer away from the oncoming vehicle and may interfere with the driver's steering attempts.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method for suppressing or deactivating a lane keeping assist (LKA) system in a host vehicle, the method comprising:
   (a) retrieving environmental data from a data gathering system;
   (b) determining an actual current lane width (w_cur) at a current position of the host vehicle of a traveling path on which the host vehicle is traveling, based on the environmental data retrieved from the data gathering system;
   (c) comparing the actual current lane width (w_cur) with a first pre-set lane width (w_set$_1$);
   (d) determining whether the actual current lane width (w_cur) is smaller than the first pre-set lane width (w_set$_1$);
   (e) detecting whether an obstacle is present on the traveling path, which obstacle will be passed by the host vehicle or which obstacle will pass the host vehicle within a pre-determined time period (t_p); and
   (f) deactivating or suppressing the lane keeping assist (LKA) system when the actual current lane width (w_cur) is smaller than the first pre-set lane width (w_set$_1$) and an obstacle is detected on the traveling path which will be passed by the host vehicle or which will pass the host vehicle within the pre-determined time period (t_p).

2. The method of claim 1 wherein step (a) includes:
   i) using a satellite positioning system to determine a current position (p_cur) of the host vehicle on the traveling path;
   ii) determining the current lane width (w_cur) of the traveling path from electronic horizon (EH) data based on the current position (p_cur) of the host vehicle.

3. The method of claim 1 wherein step (f) is performed by suppression or partial deactivation of the lane keeping assist (LKA) system to a first degree of suppression or partial deactivation which first degree of suppression or partial deactivation is determined based on the first pre-set lane width (w_set$_1$).

4. The method of claim 3 further comprising:
   (g) comparing the current lane width (w_cur) with a second pre-set lane width (w_set$_2$); and
   (h) suppressing or deactivating the lane keeping assist (LKA) system to a second degree of suppression or partial deactivation which is determined based on the second pre-set lane width (w_set$_2$).

5. The method of claim 4 further comprising iterating steps (g) and (h) one or more times.

6. The method of claim 1 wherein a relative speed between the obstacle and the host vehicle is determined and the pre-determined time period is calculated as a function of the relative speed.

7. The method of claim 1 wherein the first pre-set lane width, is a critical lane width (w_crit), the critical lane width (w_crit) being smaller than a comfortable lane width (w_comf).

8. The method of claim 1 wherein the first pre-set lane width is a comfortable lane width (w_comf), the comfortable lane width (w_comf) being greater than a critical lane width (w_crit).

9. The method of claim 1 wherein detecting the presence of an obstacle is performed based on data retrieved from the data gathering system.

10. A control unit for controlling a lane keeping system in a host vehicle, the control unit configured to:
    (a) receive data from a data gathering system;
    (b) determine an actual current lane width (w_cur) at a current position of the host vehicle of a traveling path on which the host vehicle is traveling based on data retrieved from the data gathering system;
    (c) compare the actual current lane width (w_cur) with a first pre-set lane width (w_set$_1$);
    (d) determine whether the actual current lane width (w_cur) is smaller than the first pre-set lane width (w_set$_1$);
    (e) detect whether an obstacle is present on the traveling path;
    (f) determine whether the obstacle will be passed by the host vehicle or will pass the host vehicle within a pre-determined time period (t_p); and
    (g) deactivate or suppress the lane keeping assist (LKA) system when the actual current lane width (w_cur) is smaller than the first pre-set lane width (w_set$_1$) and an obstacle is present on the traveling path which obstacle will be passed by the host vehicle or will pass the host vehicle within the pre-determined time period (t_p).

11. The control unit of claim 10 wherein determination of the current lane width (w_cur) comprises:
    determination of a current position of the host vehicle on the traveling path;
    determination of the current lane width (w_cur) using electronic horizon (EH) data derived from the current position of the host vehicle.

12. The control unit of claim 10 wherein the control unit is configured to suppress or partially deactivate the lane keeping assist (LKA) system to a first degree of suppression or partial deactivation which is determined based on the first pre-set lane width (w_set$_1$).

13. The control unit of claim 12 wherein the control unit is further configured to:
    (h) compare the current lane width (w_cur) with a second pre-set lane width (w_set$_2$); and
    (i) suppress or deactivate the lane keeping assist (LKA) system to a second degree of suppression or partial deactivation which is determined based on the second pre-set lane width (w_set$_2$).

14. The control unit of claim 13 wherein the control unit is further configured to iterate one or more times the operations of (h) compare and (i) suppress or deactivate.

15. The control unit of claim 10 wherein the control unit is configured to determine a relative speed between the obstacle and the host vehicle, and to calculate the pre-determined time period (t_p) as a function of the relative speed.

16. The control unit of claim 10 wherein the first pre-set lane width (w_set$_1$), is a critical lane width (w_crit), the critical lane width (w_crit) being smaller than a comfortable lane width (w_comf) or, wherein the first pre-set lane width (w_set$_1$) is a comfortable lane width (w_comf), the comfortable lane width (w_comf) being greater than the critical lane width (w_crit).

17. The control unit of claim 10 wherein the control unit is configured to detect the presence of an obstacle based on data retrieved from a data gathering system.

18. A vehicle comprising a lane keeping assist (LKA) system and a control unit according to claim 10.

19. The control unit of claim 10 further comprising a processor and memory.

20. A method for suppressing or deactivating a lane keeping assist (LKA) system in a host vehicle, the method comprising:
    (a) retrieving environmental data from a data gathering system;

(b) determining an actual current lane width (w_cur) at a current position of the host vehicle of a traveling path on which the host vehicle is traveling, based on the environmental data retrieved from the data gathering system;
(c) comparing the actual current lane width (w_cur) with a first pre-set lane width (w_set$_1$);
(d) determining whether the actual current lane width (w_cur) is smaller than the first pre-set lane width (w_set$_1$);
(e) after (b), (c), and (d), detecting whether an obstacle is present on the traveling path, which obstacle will be passed by the host vehicle or which obstacle will pass the host vehicle within a pre-determined time period (t_p); and
(f) deactivating or suppressing the lane keeping assist (LKA) system when the actual current lane width (w_cur) is smaller than the first pre-set lane width (w_set$_1$) and an obstacle is present on the traveling path which obstacle will be passed by the host vehicle or will pass the host vehicle within the pre-determined time period (t_p).

* * * * *